Apr. 3, 1923.
J. B. MORROW
PRESSURE REGULATOR AND CUT-OFF
Filed June 7, 1921
1,450,893
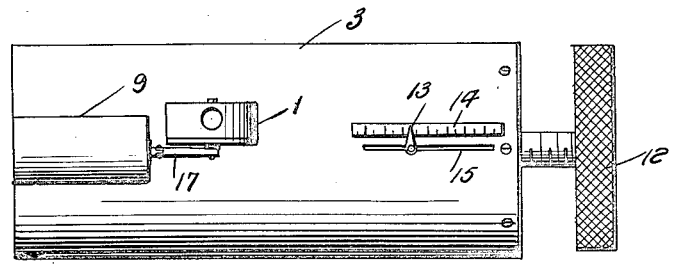
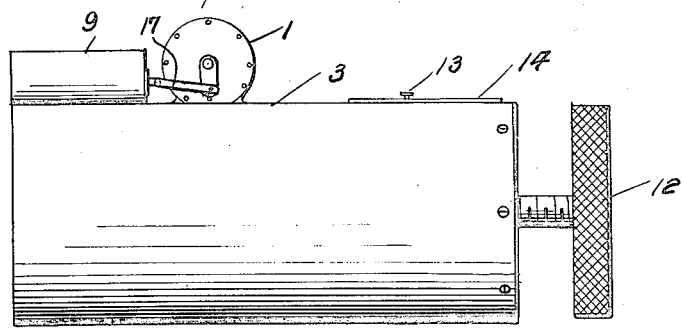
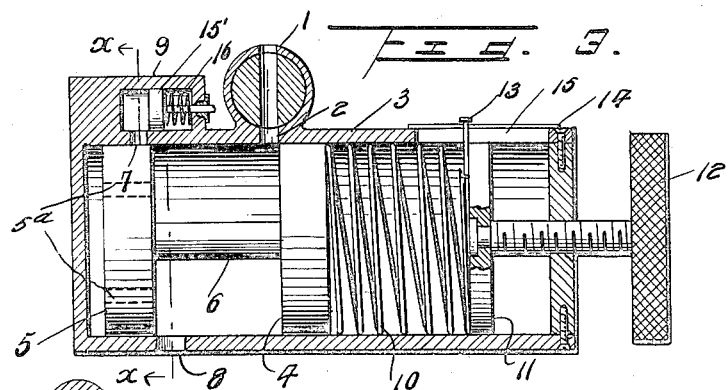
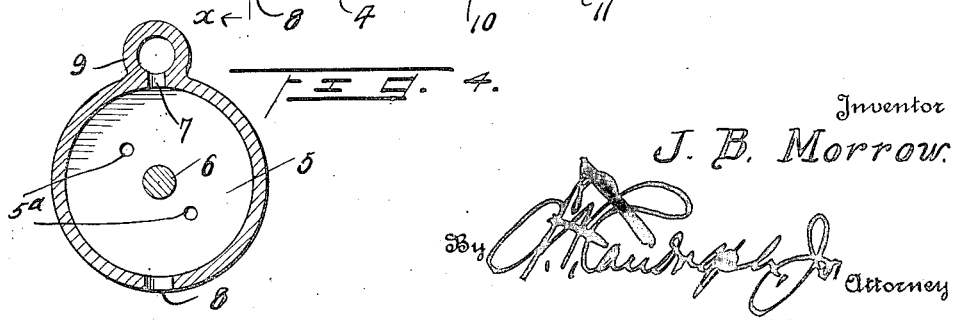
Inventor
J. B. Morrow.
By
Attorney Patented Apr. 3, 1923.

1,450,893

UNITED STATES PATENT OFFICE.

JOHN B. MORROW, OF HARRISBURG, PENNSYLVANIA.

PRESSURE REGULATOR AND CUT-OFF.

Application filed June 7, 1921. Serial No. 475,706.

*To all whom it may concern:*

Be it known that I, JOHN B. MORROW, a citizen of the United States, residing at Harrisburg, in the county of Dauphin and State of Pennsylvania, have invented certain new and useful Improvements in a Pressure Regulator and Cut-Off; and I do hereby declare the following to be a full, clear, and exact description of the invention, such as will enable others skilled in the art to which it appertains to make and use the same.

The invention relates to automatic regulator and cut off for fluid pressure and is designed specifically to provide means for preventing the over inflation of pneumatic tire and like inflatable devices.

The regulator includes a setting mechanism whereby the air pressure may be determined, and a cut off for closing the pressure supply between the article being inflated and the valve controlling the admission of air to the regulator.

Other objects and advantages will be apparent and suggest themselves as the nature of the invention is understood.

While the drawing illustrates an embodiment of the invention it is to be understood that in adapting the same to meet different conditions and requirements, various changes in the form, proportion and minor details of construction may be resorted to without departing from the nature of the invention.

Referring to the accompanying drawing forming a part of this specification,

Figure 1 is a top plan view of a combined pressure regulator and cut off embodying the invention, Figure 2 is a side view thereof, Figure 3 is a vertical, central, longitudinal section, and Figure 4 is a transverse section on the line *x—x* of Figure 3.

Corresponding and like parts are referred to in the following description and designated in the several views of the drawing by like reference characters.

The regulator and cut off comprises a cylinder 3 which is closed at opposite ends and provided in a side near one end with a longitudinal slot 15 in which operates a pointer 13 carried by a plate or disk 11 loose within the cylinder and adjustable by means of a set screw 12 threaded into a head of the cylinder and having a swivel connection at its inner end with the part 11. A scale 14 is provided at one side of the slot 15 to designate the air pressure. The pointer 13 cooperates with the scale 14 and may be set to indicate any desired pressure by means of the set screw 12.

A piston 4 has a close fit within the cylinder 3 and an expansible spring 10 is disposed between the piston 4 and the part 11 and its effective tension is regulated by means of the set screw 12. A cut off 5 is located in one end of the cylinder 3 and is connected to the piston 4 by means of a stem 6 whereby the cut off and piston move in unison. The peripheral portion of the cut off 5 has a close fit against the inner wall of the cylinder 3 and said cut off has openings 5ª for the unobstructed passage therethrough of the air pressure. An outlet 8 is provided in a side of the cylinder 3 for the discharge of the air pressure, said outlet being adapted to be connected with the air valve of a pneumatic tire or other device in any preferred way. An inlet 2 for the air pressure from a suitable source of supply is provided in a side of the cylinder 3 and is controlled by means of a valve 1 which in the preferable construction is of the rotary type. The valve 1 controls the supply of air to the cylinder 3.

A cylinder 9 is provided at one side of the cylinder 3 and is in communication therewith by means of an opening 7. A piston 15 in the cylinder 9 is connected in any manner with the valve 1 whereby when the predetermined pressure has been reached said valve 1 is closed thereby automatically cutting off further supply of pressure to the cylinder 3. A moment before this action takes place the piston 4 is moved against the tension of the spring 10 and operates the cut off 5 connected therewith to close the outlet 8 and an instant later uncover the opening 7 whereby the pressure from the cylinder 3 passes through the cut off 5 and into the cylinder 9 through the opening 7 and operates the piston 15 whereby to close the valve 1. A spring 16 in cooperative relation with the piston 15 is tensioned when the piston 15 moves to close the valve 1. When the pressure exerted on the piston 15 to effect the closing of the valve 1 decreases the spring 16 reacts and automatically moves the piston 15 and opens the valve 1 to admit a further supply of pressure to the cylinder 3 if desired. The predetermined pressure may be regulated by operating the set screw 12 and is determined by means of the scale 14 and the pointer 13 cooperating therewith. A link 17 forms the connecting means between the stem of the piston 15' and the rotary element of the valve 1.

Having thus described the invention, what I claim is:—

1. A pressure regulator and cut off comprising a cylinder having an inlet and an outlet, a piston within the cylinder at one side of the said inlet and outlet, pressure setting means in cooperative relation with the piston, a cut off connected with the piston and movable therewith to close the said outlet and normally acting to hold the piston in a given position, a valve for controlling the air pressure to the cylinder and valve operating means having communication with said cylinder to be actuated by the predetermined air pressure to close the said valve and cut off the supply thereto, the communication between the cylinder and said valve controlling means being normally closed by the said cut off connected with the piston.

2. A pressure regulator and cut off comprising a cylinder having an inlet, an outlet and a lateral opening, a piston within the cylinder at one side of the several openings, pressure regulating means associated with the piston, a cut off connected with the piston and normally holding the same in the given position and closing the said lateral opening, a valve controlling the supply of pressure to the cylinder, a supplemental cylinder in communication with the said lateral opening, and a piston in the supplemental cylinder and having connection with the said valve whereby to operate the latter and cut off the supply when the predetermined pressure has been reached within the main cylinder.

In testimony whereof I affix my signature in presence of two witnesses.

JOHN B. MORROW.

Witnesses:
CLAUDE R. OLEWINE,
HOWARD H. SCHRIVER.